United States Patent Office 3,072,530
Patented Jan. 8, 1963

3,072,530
THERAPEUTIC INDOLES FOR PSYCHIC STIMULATION AND RELIEF OF MENTAL DEPRESSION
Albert Hofmann and Franz Troxler, Bottmingen, Baselland, Switzerland, assignors to Sandoz A.G., Basel, Switzerland,
No Drawing. Filed Apr. 1, 1960, Ser. No. 19,203
Claims priority, application Switzerland Sept. 12, 1958
5 Claims. (Cl. 167—65)

This application is a continuation-in-part of co-pending application Serial No. 837,773, filed September 3, 1959, now abandoned.

The present invention relates to new therapeutically useful basic indoles and salts thereof, as well as to the use thereof for psychic stimulation and relief of mental depressions.

The new compounds correspond to the formula

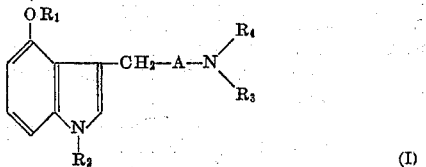

wherein $R_1$ is a hydrogen atom or a lower alkyl group (such e.g. as methyl, ethyl, propyl, isopropyl, butyl, isobutyl, etc.) or a lower aralkyl group (such e.g. as benzyl, phenylethyl, phenylpropyl, benzhydryl, etc.) and $R_2$ is a hydrogen atom, a lower alkyl group or a lower aralkyl group, $R_3$ and $R_4$ may be identical or different and each being a hydrogen atom or a lower alkyl group, or both $R_3$ and $R_4$ taken together with the adjacent nitrogen atom also may represent a piperidino group, and A is an alkylene group with at most 3 carbon atoms.

The new Compounds I can be prepared in a number of ways, the characteristic features of the processes being the following:

The process starts fundamentally with a 4-hydroxy-indole, which may be unsubstituted or substituted in the 1-position by an alkyl or aralkyl group and the hydroxyl function of which is protected—for the further sequence of reactions—by an alkyl or aralkyl group $R_1'$, whereby the aralkyl group preferably is a benzyl radical. A carbon chain with an end-positioned nitrogen function is incorporated stagewise into the 3-position of the indole, and thereafter is converted by reduction into the desired side chain of the formula

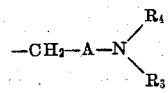

or $-CH_2-A-NH_2$. If desired, an alkyl or aralkyl substituent is introduced into the 1-position of the obtained compound and/or the hydroxyl function freed from the alkyl group or aralkyl group respectively, or from the benzyl radical by acid hydrolysis or by reduction with hydrogen and a palladium catalyst or with an alkali metal in liquid ammonia.

In preparing compounds of Formula I, substituted in the 1-position by an alkyl or aralkyl group ($R_2$=lower alkyl or aralkyl), the starting compounds generally already contain the desired substituents, so that one starts from a 4-aralkoxy-indole which is appropriately substituted in the 1-position (process variant 4; see Reaction Chart infra) or from a correspondingly substituted 4-aralkoxy-indolyl(3)-acetonitrile (process variant 2). The substituent $R_2$ can be introduced into the molecule at a later reaction stage, e.g. into a 1-position-unsubstituted indolyl(3)-acetonitrile of Formula IV ($R_2$=H) (process variant 2) or into a compound of Formula III or Form-

REACTION CHART

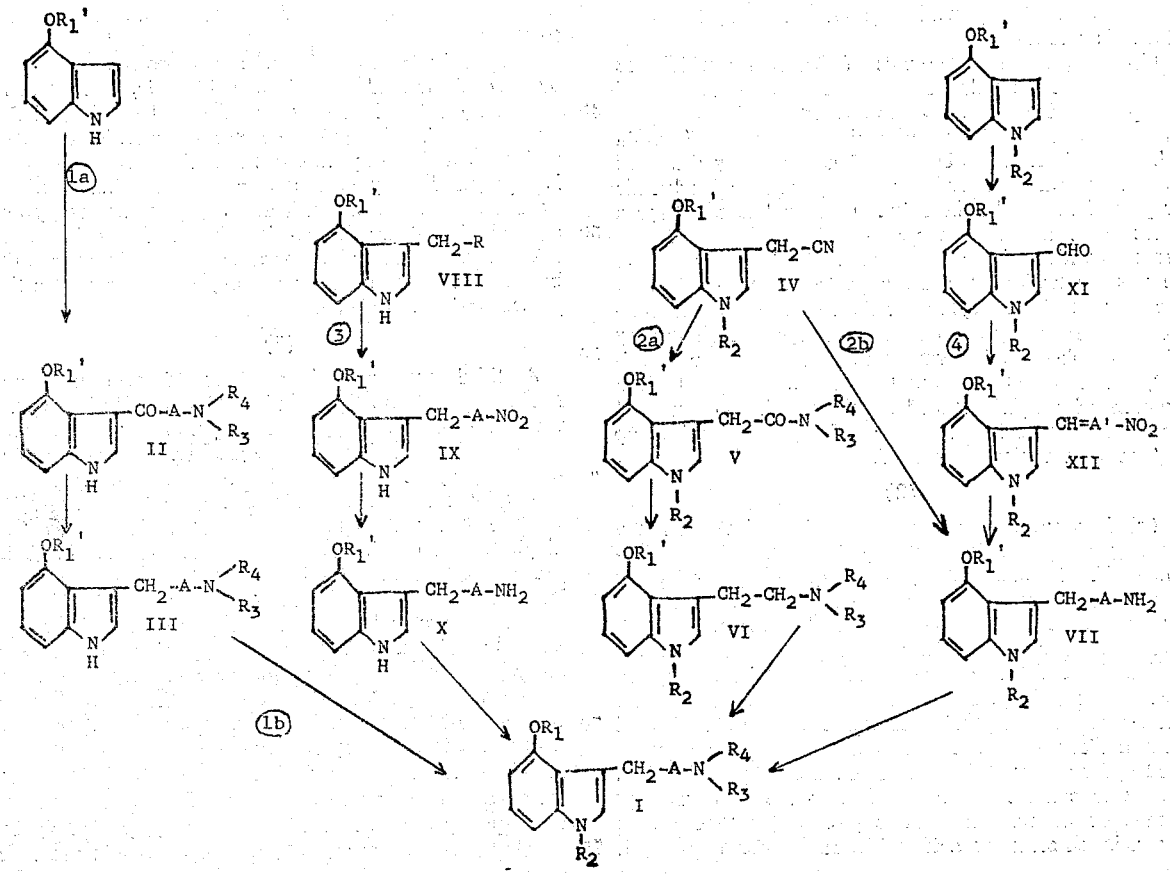

ula VI, wherein $R_2$=H (process variants 1 and 2). The process embodiments can be selected e.g. on the basis of what starting compounds are available or on the basis of preparative considerations. Each disclosed process variant is also suitable for the production of 1-unsubstituted end products of Formula I.

(1)

(a) According to a first process variant of the invention, the starting compound is a 2-aralkoxy-indole, preferably 4-benzyloxy-indole [A. Stoll et al., Helv. Chim. Acta 38, 1452 (1955)]. The use of the benzyl group as protective group or of 4-benzyloxy-indole as starting compound is, however, only a preferred manner of carrying out the process, and the invention encompasses also other aralkyl groups such e.g. as the benzhydryl group, etc., which can subsequently be split off easily.

The 4-benzyloxy-indole is dissolved in absolute ether and is then reacted with an alkylmagnesium-halide to form the corresponding 4-benzyloxy-indolyl-magnesium halide. The reaction is brought to conclusion by means of heat, after there is added dropwise a solution, e.g. in ether, of a halogen-carboxylic acid-halide of the formula $X_1$—CO—A—$X_2$, wherein $X_1$ and $X_2$ are identical or different halogen atoms. The reaction product is then treated, in the absence of solvent or in an inert organic solvent such as chloroform, carbon tetrachloride, benzene, etc., and preferably at elevated temperature, with a nitrogen compound of the formula

The resultant basic indolyl(3)-ketone of Formula II is then dissolved in an inert solvent such as tetrahydrofurane, dioxane or the like, and is reduced with lithium aluminum hydride at a temperature of 50–110° C. to form the corresponding compound of Formula III. If desired, the aralkyl group or the benzyl group $R_1'$ is split off, for example by reduction by means of catalytically activated hydrogen, preferably with a palladium catalyst and in alcoholic solution.

(b) To prepare compounds of Formula I which are substituted at the indole nitrogen atom by a lower alkyl group or an aralkyl group, the desired substituent can be introduced in the aforementioned compound of Formula III. To this end, the compound is preferably dissolved in liquid ammonia containing one equivalent of sodamide or potassium amide, the solution allowed to stand for a short time, and then the appropriate alkyl halide or aralkyl halide of formula $R_2$-hal is added to the solution. In this connection, it is desirable to avoid an excess of the very reactive benzyl halide since otherwise quaternization of the tertiary nitrogen atom of the side chain may also take place. After working up of the reaction product, the obtained compound is chromatographed on a column of aluminum oxide. If desired, the hydroxyl function can subsequently be freed of the aralkyl group $R_1'$ as hereinbefore described.

(2)

(a) In a second process variant of the invention, the starting compound is an indolyl(3)-acetonitrile of Formula IV, in which $R_1'$ is an aralkyl group, preferably the benzyl group, and $R_2$ stands for hydrogen, lower alkyl or aralkyl. The nitrile is hydrolyzed to the corresponding carboxylic acid by treatment with alkali, and the carboxylic acid then converted into the acid chloride, e.g. by means of thionyl chloride or phosphorus pentachloride. However, it is also possible to esterify the carboxylic acid with a diazo-alkane, then to convert the ester into the acid hydrazide by boiling with anhydrous hydrazine, and finally to convert the hydrazide into the acid azide by means of nitrous acid. It is preferred not to isolate the acid chloride or acid azide but rather to react it directly with ammonia or a primary or secondary alkylamine, e.g. in ether solution.

The unsubstituted acid amide of Formula V wherein each of $R_3$ and $R_4$ is hydrogen can also be prepared directly from the nitrile of Formula IV by mild alkaline hydrolysis. The resultant acid amide of Formula V is reduced with lithium aluminum hydride in ether or tetrahydrofurane or dioxane solution at a temperature of 35 to about 60° C. The optimal reaction time is 2 to 5 hours; if the reaction period is prolonged or if a higher temperature is employed, a more or less extensive splitting off of the protective group—preferably the benzyl group—takes place. If desired, the protective group of the hydroxyl function $R_1'$ of the basic indole derivative of Formula VI, obtained in the precedingly described reduction, can be split off in the manner set forth at the end of the first described process variant.

The 1-substitution products of 4-benzyloxy-indolyl(3)-acetonitrile, which are new compounds, can be prepared from a 4-benzyloxy-indole which is appropriately substituted in the 1-position: e.g. the indole is converted into a 1,4-disubstituted compound of the gramine type by means of a Mannich reaction with formaldehyde and a secondary amine, and the resultant product is treated with an alkyl halide and the obtained quaternary compound with an alkali cyanide. According to the present invention, the new compounds of Formula IV wherein $R_2$ is lower alkyl or aralkyl can also be obtained by introducing the desired substituent $R_2$ into the already known 4-benzyloxy-indolyl(3)-acetonitrile [A. Stoll et al., Helv. Chim. Acta 38, 1452 (1955)], as follows: The nitrile is treated either with an alkyl iodide or an aralkyl iodide in the presence of an alkali amide in liquid ammonia, or with an alkyl halide or an aralkyl halide at elevated temperature, preferably between 50 and 100° C., in an inert solvent, preferably in presence of dimethylformamide, and in the presence of a proton-acceptor, preferably sodium hydride.

(b) To prepare compounds of Formula I wherein the side chain carries a free amino group ($R_3$ and $R_4$=H) from a nitrile of Formula IV, the latter can be hydrolyzed to the carboxylic acid—as described under 2a—the carboxylic acid converted with ammonia into the acid amide by way of the acid chloride or acid azide, or the nitrile can be hydrolyzed directly into the acid amide and the latter reduced. However, the invention provides a shorter and more preferable procedure: The nitrile of Formula IV is reduced directly to the corresponding compound of Formula VII from which, if desired, the protective group of the hydroxyl function $R_1'$ is split off. The reduction is effected with lithium aluminum hydride or advantageously in methanolic ammonia by shaking with hydrogen in the presence of Raney nickel.

(3)

A third process variant of the present invention resides in treating a basic indole of the formula VIII in which $R_1'$ is an aralkyl group, preferably the benzyl group, and R is a dialkylamino group or the radical of a secondary cyclic amine, in the presence of a proton acceptor, with a nitro-alkane of the formula H—A—$NO_2$ wherein A has the precedingly-defined significance (an alkylene group with at most three carbon atoms). The proton-acceptor can e.g. be an alkali hydroxide, an alkali alcoholate or preferably an alkali metal. The reaction mixture is heated under reflux, optionally in an inert atmosphere, until the secondary amine HR has been completely split off, after which the mixture is filtered, the filtrate evaporated to dryness, and the resultant nitro derivative of Formula IX purified by crystallization from a suitable solvent or by chromatography on a column of aluminum oxide. The reduction of the nitro derivative to the corresponding amine of Formula X is carried out e.g. with spongy copper-zinc, or catalytically, preferably by shaking in methanol solution with hydrogen in presence of Raney nickel. If desired, the protective group of the hydroxyl function $R_1'$ can be split off from the obtained compound of Formula X.

The preferred starting material for this process variant—4-benzyloxy-gramine—is known [A Stoll et al., Helv. Chim. Acta 38, 1452 (1955)].

(4)

According to a fourth process variant of the present invention, the starting compound is a 4-aralkoxy-indole which may be substituted in 1-position by alkyl or aralkyl. The starting compound is first converted into a substituted indolyl(3)-aldehyde of Formula XI, preferably by treatment with dimethylformamide and phosphorus oxychloride, and the so-obtained aldehyde is heated with a nitro-alkane of formula H—A—$NO_2$, in which A is as precedingly defined, in the presence of a condensing agent, such as ammonium acetate or piperidine, which splits off water. The resultant nitro compound of Formula XII, wherein A' stands for an alkylidenyl group, is reduced to a basic indole derivative of Formula VII. The reduction is advantageously carried out by treatment with lithium aluminum hydride in an inert solvent such as dioxane, tetrahydrofurane, etc. and at elevated temperature, e.g. 50–100° C. If desired, the protective group of the hydroxyl function $R_1'$ can be split off from the obtained Compound VII.

1-substituted 4-benzyloxy-indoles, which are also new compounds (Formula X: $R_2$=alkyl or aralkyl), can be prepared by reacting 4-benzyloxy-indole in liquid ammonia with an alkyl halide or an aralkyl halide in presence of an alkyl amide or in an inert organic solvent such as benzene, toluene, xylene, etc. with the desired alkylating or aralkylating agent in the presence of a proton-acceptor such as sodium hydride, an alkali amide or an alkali alcoholate, preferably at elevated temperature and in an inert atmosphere.

One subgroup (Ia) of compounds according to this invention is constituted by those corresponding to the formula

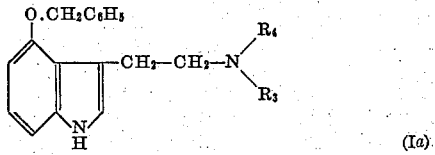

wherein $R_3$ and $R_4$ have the precedingly-recited significances.

A further special subgroup (Ib) of compounds according to this invention is constituted by those corresponding to the formula

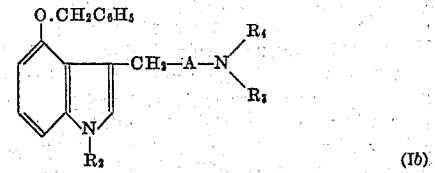

wherein $R_2$ is lower alkyl, and $R_3$, $R_4$ and A have the precedingly-recited significances.

Still another special subgroup (Ic) of the compounds according to this invention is constituted by the compounds of the formula

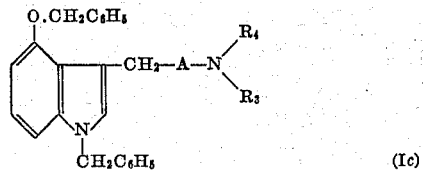

wherein $R_3$, $R_4$ and A have the precedingly-recited significances.

Still another special subgroup (Ic) of compounds according to this invention is constituted by those corresponding to the formula

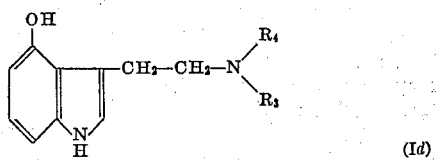

wherein $R_3$ and $R_4$ have the precedingly-recited significances.

Another subgroup (Ie) of compounds within the ambit of this invention is made up of compounds of the formula

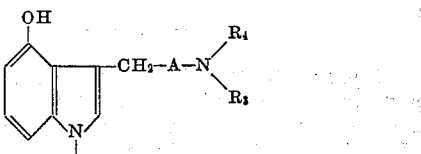

wherein $R_2$ is lower alkyl, and $R_3$, $R_4$ and A have the precedingly-recited significance.

A still further special subgroup (If) within the scope of the invention is constituted by compounds of the formula

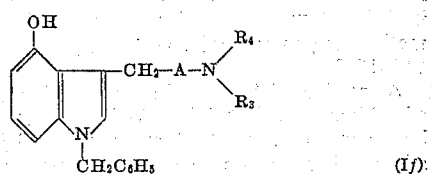

wherein $R_3$, $R_4$ and A have the precedingly-recited significances.

The new basic indole derivatives, described in greater detail in the examples which follow, are solid crystalline compounds at room temperature (about 20 to about 30° C.). They are moderately readily soluble in organic solvents, but only difficultly soluble in water. By reaction with inorganic or organic acids, the new basic indole derivatives form a wide variety of therapeutically acceptable salts which are crystalline at room temperature and of good stability. The salts, which are generally of good solubility in water, can be used therapeutically in the same manner and for the same purposes as the bases, as hereinafter set forth. Illustrative of the aforesaid salts are the sulfates, hydrochlorides, hydrobromides, acetates, oxalates, benzoates, hexahydrobenzoates, succinates, tartrates, maleinates, methanesulfonates, etc., all obtainable by reacting the base with the corresponding acid. They give a positive color reaction with Keller's color reagent (glacial acetic acid containing ferric chloride and concentrated sulfuric acid). With Van Urk's color reagent (p-dimethylamino-benzaldehyde and dilute sulfuric acid), they generally give a positive reaction.

The new basic indole derivatives I of the present invention and their salts (cf. supra) are distinguished in the animal organism by interesting and therapeutically valuable pharmacodynamic properties. More especially, they bring about a stimulation of the central sympathetic nervous system which manifests itself as mydriasis, rise in blood pressure, rise in body temperature and rise in blood sugar level as well as in an inhibition of intestinal motility. In addition, they have distinct serotonin-antagonizing properties and they stimulate the spinal reflexes. At the same time, they have a moderate sedative and tranquilizing action. In addition, they suppress the sedative and convulsion-stimulating effects of reserpine.

As a result of their action on the vegetative nervous system and their tranquilizing as well as their reserpine-antagonizing properties, they are useful in the treatment of various mental illnesses, such more especially as compulsive neuroses as well as depressions, mood changes and anxiety states of neurotic and psychotic origin. Compounds I have a very low toxicity. They are practically quantitatively resorbed and are therefore preferably administered perorally, but can equally well be administered subcutaneously, intramuscularly or intravenously. While they are thus intended for therapeutic purposes, they are also very valuable intermediates for the preparation of other medicaments.

The following examples illustrate the invention but are not limitative thereof in any way. Parts and percentages are by weight, unless otherwise indicated; the relationship between parts by weight and parts by volume is the same as that between grams and milliliters. Temperatures are in degrees centigrade; melting points are uncorrected.

*Example 1*

12 parts of 4-benzyloxy-indole are dissolved in 300 parts by volume of ether and 9.6 parts of oxalyl chloride are stirred dropwise into the solution at a temperature of 0–3°. 30 minutes after the addition has been completed, 20 parts of anhydrous dimethylamine are slowly added while stirring and cooling with ice; the mixture is then stirred for a few minutes at room temperature and the precipitate filtered off. The precipitate is washed thoroughly with water and the water-insoluble portion is dried in a high vacuum. A yellow crystalline powder is obtained, which crystallizes from a mixture of benzene-methanol upon gradual addition of petroleum ether. M.P. 148–150°.

A solution of 4 parts of the so-obtained dimethylamide of [4-benzyloxy-indolyl-(3)]-glyoxylic acid in 80 parts by volume of absolute dioxane is added dropwise while stirring thoroughly into a solution of 5 parts of lithium aluminum hydride in 100 parts by volume of absolute dioxane. The mixture is stirred for 24 hours under reflux at boiling temperature. The complex which has been formed and excess of reducing agent are then decomposed by threatment with methanol and a saturated solution of sodium sulfate, the mixture is filtered and the filtrate shaken out with a solution of tartaric acid and ether. The ether solution is discarded, while the tartaric acid extract is made alkaline to phenolphthalein by addition of concentrated aqueous caustic soda solution. The crude base, which thereby separates out as an oily substance, solidifies slowly. The so-obtained 4-benzyloxy-N,N-dimethyltryptamine

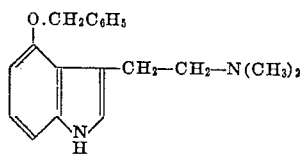

is dissolved in benzene and the benzene solution filtered through a column of aluminum oxide in order to eliminate some by-products. A colorless oil is thus obtained, which crystallizes from ether-petroleum ether as prisms which melt at 119–121°.

*Example 2*

A solution of 4 parts of 4-benzyloxy-dimethyltryptamine in 100 parts by volume of methanol is shaken with 2 parts of palladium catalyst on aluminum oxide and with hydrogen. When the hydrogen uptake has finished, the solution is filtered and the solvent evaporated to dryness. The residue is sublimated in a high vacuum at a temperature of 130°, whereby snow-white 4-hydroxy-N,N - dimethyltryptamine—4 - hydroxy - 3 - (2'-dimethylaminoethyl)-indole—which melts at 173–176° is obtained. Keller's color reaction: blue.

The oxalate of 4-hydroxy-N,N-dimethyltryptamine is prepared by treating 0.204 part of the base with 0.045 part of oxalic acid in acetone solution. The oxalate forms aggregates of small prisms which melt at 239–240°.

*Example 3*

A solution of 5 parts of 4-benzyloxy-indole in 120 parts by volume of ether is treated while stirring with 4 parts by volume of oxalyl chloride at a temperature of —5 to —7°. The mixture is allowed to stand for an hour at a temperature of —5° and a solution of 20 parts by volume of anhydrous diethylamine in 30 parts by volume of ether is then added dropwise. After two hours, the mixture is filtered, the precipitate washed with water and the so-obtained water-insoluble diethylamide of [4-benzyloxy-indolyl-(3)]-glyoxylic acid crystallized from ethanol. M.P. 117–119°.

6.3 parts of lithium aluminum hydride are dissolved in 150 parts by volume of absolute dioxane and a solution of 4.9 parts of the diethylamide of [4-benzyloxy-indolyl-(3)]-glycoxylic acid in 80 parts by volume of absolute dioxane are added while stirring at boiling temperature. The mixture is boiled under reflux for 24 hours and thereafter treated with methanol and saturated sodium sulfate solution. The mixture is filtered and the filtrate shaken out with ether and a 0.5-normal aqueous solution of tartaric acid. After liberation and isolation of the base is described in Example 1, the crude 4-benzyloxy-N,N-diethyltryptamine is dissolved in benzene and the benzene solution filtered through a column of aluminum oxide. M.P. 100–101° after crystallization from benzene.

*Example 4*

A solution of 2.8 parts of 4-benzyloxy-N,N-diethyltryptamine in 50 parts by volume of methanol is shaken with 2 parts of palladium catalyst on aluminum oxide and with hydrogen. When the hydrogen uptake has finished, the solution is filtered, the filtrate evaporated to dryness and the so-obtained 4-hydroxy-N,N-diethyltryptamine distilled in a high vacuum. The distillate crystallizes from ether; M.P. 99–101°.

*Example 5*

A solution of 8 parts by volume of oxalyl chloride in 70 parts by volume of ether is added dropwise to a solution of 10 parts by volume of 4-benzyloxy-indole in 200 parts by volume of aboslute ether. The solution is shaken for 30 minutes and then 40 parts by volume of piperidine and 50 parts by volume of ether are added while cooling. The reaction mixture is allowed to stand at room temperature for 2 hours and the precipitate is thereafter filtered off and shaken out with water and chloroform. The chloroform solution is evaporated, whereby the pure piperidide of [4-benzyloxy-indolyl-(3)-glyoxylic acid is obtained: M.P. 132–137°.

7.1 parts of the piperidide of [4-benzyloxy-indolyl-(3)]-glyoxylic acid in 250 parts by volume of boiling absolute dioxane are stirred with 8.7 parts of lithium aluminum hydride in 150 parts by volume of absolute dioxane. Thereupon, the excess of reducing agent is decomposed by treatment with methanol and saturated sodium sulfate solution. The mixture is filtered and the filtrate shaken out with ether and tartaric acid solution. The crude 4-benzyloxy-3-(piperidino-ethyl)-indole is liberated and isolated from the tartaric acid extract as described in Example 1. It crystallizes from ethyl acetate; M.P. 126–128°.

*Example 6*

3.6 parts of 4-benzyloxy-3-(piperidino-ethyl)-indole are shaken in 110 parts by volume of methanol with 3.4 parts of palladium catalyst on aluminum oxide and with hydrogen. When the hydrogen uptake has finished, the catalyst is filtered off and the filtrate is evaporated to dryness. The 4-hydroxy - 3 - (piperidino-ethyl)-ndole crystallizes from ethyl acetate in the form of massive plates of M.P. 182–183°. Keller's color reaction: green.

*Example 7*

To a solution of 1 part of 4-methoxy-indole [Blaikie et al., J. Chem. Soc. 125, 296 (1924)], in 25 parts by volume of ether, there are added 1.3 parts of oxalyl chloride at a temperature of 0 to 5°, stirring then continued for 15 more minutes, following which a mixture of 0.46 part of dimethylamine and 5 parts by volume of ether are added dropwise at the same temperature. After stirring the mixture for two hours at room temperature, the resultant precipitate is filtered off, washed with ether, then suspended in water, again filtered, and then washed several times with water. The so-obtained water-insoluble 4-methoxy-indolyl(3)-glyoxylic acid-dimethylamide is finally recrystallized from benzene, whereupon it is obtained in the form of prisms which melt at 183–184°.

A solution of 4.75 parts of 4-methoxy-indolyl(3)-glyoxylic acid-dimethylamide in 300 parts by volume of dioxane is boiled with 7.9 parts of lithium aluminum hydride for 24 hours under reflux, after which the resultant complex and excess reducing agent are decomposed by the dropwise addition of methanol; then 40 parts by volume of saturated aqueous sodium chloride solution are added, the mixture filtered, and the filtrate distributed between tartaric acid solution and ether. The basic reduction product is liberated and isolated, then first distilled at 170–180° in high vacuum and the distillate recrystallized from benzene, whereby the desired 4-methoxy-N,N-dimethyltryptamine—4 - methoxy - 3 - (2'-dimethylaminoethyl) - indole—is obtained in the form of laminated plates which melt at 89–92°. Keller's color reaction: olive-brown. Van Urk's color reaction: blue.

Example 8

The Grignard salt is prepared from 4.8 parts of magnesium chips with 14.5 parts by volume (34 parts) of methyl iodide and 300 parts by volume of absolute ether; thereupon a solution of 22.3 parts of 4-benzyloxy-indole in 250 parts of absolute ether is stirred in dropwise at room temperature. The mixture is heated to boiling for 1½ hours, after which it is cooled to 0°, at which temperature a solution of 25.4 parts of α-chloropropionyl chloride in 200 parts by volume of absolute ether is added dropwise, and the mixture stirred for 30 minutes at 0° and then for two hours at room temperature. Without isolating the resultant 4-benzyloxy-3-(α-chloropropionyl)-indole, 150 parts by volume of 33% alcoholic dimethylamine solution are stirred in at 0°, the mixture allowed to stand overnight, after which 250 parts by volume of 20% aqueous ammonium chloride solution are added, while cooling. After complete dissolution of the formed precipitate, the solution is distributed between chloroform and normal aqueous tartaric acid solution, the base liberated from the tartaric acid solution, and the free base taken up in chloroform. After drying the chloroform solution and evaporating off the solvent, the obtained crude 4-benzyloxy-3-(α-dimethylaminopropionyl)-indole is crystallized from ethyl acetate and then from acetone. It is obtained from acetone as druse-shaped crystals which melt at 149–152°. Keller's color reaction: blue. Van Urk's color reaction: negative.

A solution of 2.27 parts of 4-benzyloxy-3-(α-dimethylaminopropionyl)-indole in 140 parts by volume of absolute dioxane is stirred dropwise into a boiling solution of 2.8 parts of lithium aluminum hydride and 60 parts by volume of absolute dioxane, and the resultant mixture heated to boiling for 36 hours. Decomposition of the complex is carried out—while cooling with ice—first with 25 parts by volume of methanol and then with 40 parts by volume of saturated aqueous sodium sulfate solution. The resultant precipitate is filtered off with suction, washed with chloroform, the filtrate evaporated and the resultant crude product chromatographed on the 50-fold quantity of aluminum oxide. The 4-benzyloxy-3-(2'-dimethylaminopropyl)-indole is eluted from the column with alcohol-free absolute benzene. It is crystallized from benzene-petroleum ether; M.P. 126°. Keller's color reaction: green. Van Urk's color reaction: blue, violetish.

Example 9

A solution of 0.480 part of 4-benzyloxy-3-(2'-dimethylaminopropyl)-indole in 40 parts by volume of methanol is shaken with 0.300 part of a catalyst containing 5% palladium on aluminum oxide carrier, while introducing hydrogen, until hydrogen uptake ceases. The catalyst is then removed by suction filtration, the methanol distilled off and the residue crystallized from ethyl acetate. The obtained 4-hydroxy-3-(2'-dimethylaminopropyl) - indole forms rectangular beveled plates which melt at 138–139°. Keller's color reaction: gray-blue. Van Urk's color reaction: dark green-bluish, turns violet after standing overnight.

Example 10

By following the procedure according to Example 8, 4-benzyloxy - 3 - (β-chloropropionyl)-indole is prepared from 4-benzyloxy-indole and β-chloropropionyl chloride, whereupon it is converted into 4-benzyloxy-3-(β-dimethylaminopropionyl)-indole by reaction with dimethylamine. Crystallizes from acetone in the form of cubes which melt at 131–132°. Keller's color reaction: dark blue. Van Urk's color reaction: light blue, violetish.

By lithium aluminum hydride reduction of the 4-benzyloxy-3-(3'-dimethylaminopropionyl)-indole, there is obtained 4-benzyloxy - 3 - (3'-dimethylaminopropyl)-indole. The latter crystallizes from benzene-petroleum ether in the form of prisms and needles which melt at 84–86°. Keller's color reaction: brown-green. Van Urk's color reaction: blue.

Example 11

0.662 part of 4-benzyloxy-3-(3'-dimethylaminopropyl)-indole, and 0.400 part of a 5% palladium-containing catalyst on aluminum oxide carrier are shaken in 50 parts by volume of methanol with hydrogen until the hydrogen uptake ceases. The catalyst is filtered off with suction, the methanol distilled off, and the residue recrystallized from methanol-chloroform; the so-obtained 4-hydroxy-3-(3'-dimethylaminopropyl)-indole melts at 196–199°. Keller's color reaction: first dirty green, then blue. Van Urk's color reaction. blue-violet.

Example 12

4-benzyloxy-indolyl-magnesium-bromide is first reacted with chloroacetic acid chloride, the reaction product treated with dimethylamine and reduced with lithium aluminum hydride. The resultant 3-(2'-dimethylaminoethyl)-4-benzyloxy-indole crystallizes from ether-petroleum ether in the form of prisms which melt at 119–121°. Keller's color reaction: olive-brown. Van Urk's color reaction: blue.

0.900 part of 3-(2'-dimethylaminoethyl)-4-benzyloxy-indole is added to a solution of potassium amide in liquid ammonia, prepared from 0.165 part of potassium, the mixture then stirred for 30 minutes at −60°, 0.650 part of methyl iodide added, and after a delay of 15 minutes the ammonia evaporated off. The residue is distributed between water and chloroform, the chloroform layer separated and the chloroform evaporated. The so-obtained crude product is chromatographed on a column of aluminum oxide, the 1-methyl-3-(2'-dimethylaminoethyl)-4-benzyloxy-indole being washed into the filtrate with benzene. The substance crystallizes from ether-petroleum ether in the form of rodlets which melt at 62–67°. Keller's color reaction: greenish, then weakly brown. Van Urk's color reaction: weak brown.

Example 13

1.92 parts of 1-methyl-3-(2'-dimethylaminoethyl)-4-benzyloxy-indole are dissolved in 15 parts by volume of methanol and then shaken with 0.500 part of palladium catalyst on aluminum oxide carrier and with hydrogen until the hydrogen uptake ceases. The catalyst is then filtered off, and the solvent is evaporated from the filtrate. The so-obtained 1-methyl-3-(2'-dimethylaminoethyl)-4- hydroxy-indole crystallizes from methanol-ether as irregular plates which melt at 125–127°. Keller's color reaction: gray. Van Urk's color reaction: green. With oxalic acid, the base forms the 1-methyl-3-(2'-dimethyl-aminoethyl)-4-hydroxy-indole-bioxalate: crystallizes from methanol as aggregates of needles, M.P. 166–167°.

*Example 14*

To a solution in liquid ammonia of potassium amide —prepared from 1 part of potassium—there are added 3.3 parts of 3-(2'-dimethylaminoethyl)-4-benzyloxy-indole, after which the mixture is stirred for about 30 more minutes at −60°, then 2.1 parts of benzyl bromide are added, and after an interval of 30 minutes the ammonia evaporated off. The residue is distributed between water and chloroform, the chloroform dried over sodium sulfate, evaporated, and the residue chromatographed on a column of aluminum oxide, the obtained 1-benzyl-3-(2'-dimethylaminoethyl)-4-benzyloxy-indole being washed into the filtrate by benzene which contains 0.1% ethanol. The product crystallizes from benzene-petroleum ether as needles which melt at 87–88°. Keller's color reaction: greenish, then weak brown. Van Urk's color reaction: brown.

*Example 15*

A solution of 2 parts of 1-benzyl-3-(2'-dimethylamino-ethyl)-4-benzyloxy-indole in 30 parts by volume of methanol is shaken with 0.7 part of palladium catalyst on aluminum oxide carrier and with hydrogen until hydrogen uptake ceases, after which the mixture is filtered, and the filtrate evaporated to dryness. The residue crystallizes from benzene in the form of aggregates of compacted prisms. The thus-obtained 1-benzyl-3-(2'-dimethylaminoethyl)-4-hydroxy-indole melts at 112–118°. Keller's color reaction: olive green. Van Urk's color reaction: weak greenish blue.

*Example 16*

5.88 parts of 3-(2'-dimethylaminoethyl)-4-benzyloxy-indole are added to a solution of sodamide in liquid ammonia—prepared from 0.550 part of sodium—after which the reaction mixture is stirred for about 45 more minutes at −60°. Then a solution of 3.28 parts of ethyl iodide in 50 parts by volume of absolute ether are added, the mixture allowed to stand for three hours and the ammonia evaporated off. The so-obtained residue is dissolved in ether, the solution filtered through talc, the ether evaporated off, and the resultant residue chromatographed on a column of aluminum oxide, using benzene as eluant. The so-obtained oily 1-ethyl-3-(2'-dimethylaminoethyl)-4-benzyloxy-indole, upon standing, crystallizes in the form of plates and massive prisms; the melting point of the solidified oil is 43–45°. Keller's color reaction: brownish. Van Urk's color reaction: weak rose.

*Example 17*

A solution of 3.66 parts of 1-ethyl-3-(2'-dimethyl-aminoethyl)-4-benzyloxy-indole in 100 parts by volume of methanol is shaken with hydrogen and 3 parts of palladium catalyst on aluminum oxide carrier until the theoretically required quantity of hydrogen has been taken up. The catalyst is then filtered off, the filtrate evaporated to dryness, and the residue from the evaporation chromatographed on a column of aluminum oxide with chloroform as eluant. The so-obtained 1-ethyl-3-(2'-dimethylaminoethyl)-4-hydroxy-indole crystallizes from benzene-petroleum ether in the form of rhombic plates which melt at 105–107°. Keller's color reaction: dark gray. Van Urk's color reaction: emerald-green.

*Example 18*

5.8 parts of 4-benzyloxy-indolyl(3)-acetonitrile are boiled under reflux for 15 hours with 12 parts of caustic potash in 36 parts by volume of ethanol and 28 parts by volume of water. Thereupon 15 parts by volume of glacial acetic acid and 150 parts by volume of water are added, and the 4-benzyloxy-indolyl(3)-acetic acid which precipitates is filtered off. Recrystallization thereof from aqueous methanol yields prisms and plates which melt at 186–189°.

1.76 parts of 4-benzyloxy-indolyl(3)-acetic acid are stirred with 1.48 parts of phosphorus pentachloride in 50 parts by volume of ether, while cooling with ice, until complete dissolution is achieved, whereupon a mixture of 5 parts by volume of methylamine and 10 parts by volume of ether is added dropwise, the resultant mixture being then distributed between water and chloroform. The chloroform is evaporated from the chloroform layer, leaving as residue 4-benzyloxy-indolyl(3)-acetic acid-monomethylamide, which crystallizes from benzene in the form of hexagonal plates which melt at 150–153°.

A solution of 1.35 parts of lithium aluminum hydride in 40 parts by volume of tetrahydrofurane is added dropwise to a solution of 1.55 parts of 4-benzyloxy-indolyl(3)-acetic acid-monomethylamide in 40 parts by volume of tetrahydrofurane, the mixture stirred for 17 hours at a bath temperature of 42°, the complex decomposed with methanol and saturated aqueous sodium sulfate solution, the mixture filtered and the filtrate distributed between ether and aqueous tartaric acid solution. The basic reduction product—3-(2'-methylaminoethyl)-4-benzyloxy-indole—liberated from the tartaric acid solution and isolated, crystallizes from ether in the form of massive rectangular plates which melt at 105–106°. Keller's color reaction: olive-brown. Van Urk's color reaction: blue.

*Example 19*

A solution of 3-(2'-methylaminoethyl)-4-benzyloxy-indole in 10 parts by volume of methanol is shaken with 0.150 part of palladium catalyst on aluminum oxide carrier and with hydrogen until the hydrogen uptake is completed, whereupon the catalyst is filtered off, the filtrate evaporated to dryness, and the obtained 3-(2'-methyl-aminoethyl)-4-hydroxy-indole is treated with oxalic acid to convert it into the neutral oxalate; M.P. 150–152°. Keller's color reaction: olive-green, becomes gray. Van Urk's color reaction: blue.

*Example 20*

4-benzyloxy-indolyl(3)-acetonitrile is hydrolyzed to the 4-benzyloxy-indolyl(3)-acetic acid, after the manner described in Example 18, and the acid then converted into the 4-benzyloxy-indolyl(3)-acetic acid-monoethylamide, after the manner described in Example 18 except that the methylamine is replaced by ethylamine. The 4-benzyloxy-indolyl(3)-acetic acid-monoethylamide crystallizes from benzene in the form of tapered prisms which melt at 155–156°.

The 4-benzyloxy-indolyl(3) - acetic acid - monoethyl-amide is then reduced with lithium aluminum hydride, after the manner described in Example 11, yielding the desired 3-(2'-ethylaminoethyl)-4-benzyloxy-indole which crystallizes from ether in the form of needles which melt at 97–100°. Keller's color reaction: olive-brown. Van Urk's color reaction: blue.

*Example 21*

3-(2'-ethylaminoethyl)-4-benzyloxy - 4 - indole is subjected to debenzylation after the manner described in Example 19 for 3-(2'-methylaminoethyl) - 4 - benzyloxy-4-indole. The here-obtained 3-(2'-ethylaminoethyl)-4-hydroxy-indole is converted, by reaction with oxalic acid, to the neutral oxalate which crystallizes from methanol-acetone in the form of small prisms and plates which melt at 218–222°. Keller's color reaction: olive-green, becomes gray. Van Urk's color reaction: blue.

*Example 22*

A warm solution of 15 parts of 4-benzyloxy-indole in a mixture of 75 parts by volume of toluene and 10 parts by volume of dimethylformamide is stirred into a suspension of 2.0 parts of sodium hydride in 200 parts by volume of toluene, using a nitrogen atmosphere. The mixture is then stirred for 1½ hours at room temperature, after which 10.5 parts of n-butyl bromide is added dropwise, following which the reaction mixture is maintained for 20 hours at 60°. Excess sodium hydride is then decomposed by the addition of methanol, precipitated sodium bromide is suction-filtered off, the filtrate is evaporated and the resultant residue is chromatographed with chloroform on a column of aluminum oxide. The thus-obtained oily 1-n-butyl-4-benzyloxy-indole solidifies at +5°; B.P. 170–175°/0.1 mm. Hg. Keller's color reaction: dark olive-green. Van Urk's color reaction: red-violet.

29.4 parts of 33% ethanolic dimethylamine solution are added dropwise at 0–10° to a solution of 13.26 parts of 1-n-butyl-4-benzyloxy-indole in 80 parts by volume of glacial acetic acid and 60 parts by volume of ethanol, after which a mixture of 4.4 parts of 38% aqueous formaldehyde solution and 10 parts by volume of glacial acetic acid is added at 0°. The mixture is allowed to stand for 15 hours at room temperature, then diluted with 1000 parts by volume of water, strongly acidified with normal aqueous hydrochloric acid, and filtered through talc. The filtrate is adjusted to alkalinity with 40% aqueous caustic soda solution while cooling, after which it is thoroughly shaken out with chloroform. The chloroform extract is dried over sodium carbonate, evaporated, and the resultant residue chromatographed with chloroform on a column of aluminum oxide.

13.74 parts of the so-obtained 1-n-butyl-4-benzyloxy-gramine are dissolved in 200 parts by volume of ether, after which 250 parts by volume of methyl iodide are slowly dropped in at 0 to 5°; stirring is then continued for one hour at the said temperature, following which the reaction mixture is allowed to stand for 60 hours at +5°. The mixture is then evaporated to dryness at 40° under reduced pressure, following which the residue is dried for 3 more hours at the same temperature in a high vacuum. To the so-obtained 1-n-butyl-4-benzyloxy-gramine-iodomethylate, there are added 18 parts of sodium cyanide and 350 parts by volume of water, and the mixture stirred and heated to 80° for 18 hours. The mixture is then extracted with chloroform, the chloroform solution dried over sodium carbonate and then evaporated, and the resultant residue chromatographed with benzene on a column of aluminum oxide. The so-obtained 1-n-butyl-4-benzyloxy-indolyl(3)-acetonitrile is recrystallized from benzene-petroleum ether, whereupon it melts at 67–69°. Keller's color reaction: brown. Van Urk's color reaction: negative.

A solution of 5.6 parts of 1-n-butyl-4-benzyloxy-indolyl(3)-acetonitrile in 175 parts by volume of ether is stirred, in a nitrogen atmosphere, into a boiling solution of 3.4 parts of lithium aluminum hydride in 175 parts by volume of ether, following which the mixture is heated to boiling for 1½ hours. The complex and excess lithium aluminum hydride are thereupon decomposed with methanol and saturated aqueous sodium sulfate solution, the mixture filtered, the filtrate washed with ether and then shaken out with tartaric acid. The resultant acid solution is then adjusted to alkalinity with dilute aqueous sodium hydroxide solution while cooling with ice, after which it is quickly shaken out several times with ether, the combined ether extracts dried over sodium sulfate and the ether then evaporated off. The residual crude product is chromatographed on a column of aluminum oxide, the formed 1-n-butyl-3-(2'-aminoethyl)-4-benzyloxy-indole being washed into the filtrate with benzene +1% methanol.

4.266 parts of the thus-obtained pure 1-n-butyl-3-(2'-aminoethyl)-4-benzyloxy-indole are dissolved in 20 parts by volume of ether, and the resultant solution is added to a solution of 1.43 parts of oxalic acid in 15 parts by volume of ethanol. The 1-n-butyl-3-(2'-aminoethyl)-4-benzyloxy-indole-bioxalate crystallizes in the form of druse-shaped crystals which melt at 180–182°. Keller's color reaction: yellow-brown. Van Urk's color reaction: negative.

*Example 23*

6.988 parts of 4-benzyloxy-indolyl(3)-acetonitrile, 0.800 part of sodium hydride, 80 parts by volume of toluene and 20 parts by volume of dimethylformamide are stirred together for two hours at 60°. Following the addition of 6 parts of n-butyl bromide, the reaction mixture is kept at 60° for 15 more hours. Excess sodium hydride is then decomposed by the addition of 5 parts by volume of methanol, the reaction mixture is shaken out with 100 parts by volume of water and then extracted three times with chloroform. The combined chloroform extracts are dried over sodium carbonate and then evaporated to dryness. The resultant residue is chromatographed with benzene on a column of aluminum oxide. The thus-obtained 1-n-butyl-4-benzyloxy-indolyl (3)-acetonitrile, when recrystallized from benzene-petroleum ether, melts at 67–69°. Keller's color reaction: brown. Van Urk's color reaction: negative.

The so-obtained 1-n-butyl-4-benzyloxy-indolyl(3)-acetonitrile is then converted into the 1-n-butyl-3-(2'-aminoethyl)-4-benzyloxy-indole by the process described in Example 22. The pure indole is then isolated in the form of the bioxalate (cf. Example 22).

4.234 parts of 1-n-butyl-3-(2'-aminoethyl)-4-benzyloxy-indole-bioxalate are dissolved in 150 parts by volume of methanol and hydrogenated in the presence of 3 parts of palladium catalyst on aluminum oxide carrier until uptake of hydrogen ceases. The catalyst is filtered off, and the filtrate is concentrated down to incipient crystallization, whereupon 1-n-butyl-3-(2'-aminoethyl)-4-hydroxy-indole-oxalate — M.P. 271–273° — crystallizes out. Keller's color reaction: olive-green. Van Urk's color reaction: light olive-green.

*Example 24*

0.45 part of sodium is dissolved in 150 parts by volume of nitroethane, after which 27.5 parts of 4-benzyloxy-gramine are added and the mixture boiled under reflux and in a stream of nitrogen for 6½ hours. The reaction mixture is then filtered, the filtrate washed with saturated aqueous sodium chloride solution, dried, evaporated to dryness, and the residue crystallized from chloroform. The so-obtained 3-(2'-nitropropyl)-4-benzyloxy-indole forms yellowish shuttle-shaped plates which melt at 108–109°.

15.5 parts of 3-(2'-nitropropyl)-4-benzyloxy-indole are shaken, in 400 parts by volume of ammonia-saturated methanol, with Raney nickel from 10 parts of Raney alloy, 0.100 part of chloroplatinic acid and hydrogen until uptake of the latter ceases. Thereupon the solution is filtered, and the spontaneously crystallizing filtrate concentrated to about 100 parts by volume, whereby the desired 3-(2'-aminopropyl)-4-benzyloxy-indole is obtained in the form of small crystalline prisms which melt at 148–149°. Keller's color reaction: olive-brown. Van Urk's color reaction: blue.

With methane-sulfonic acid, the base forms the 3-(2'-aminopropyl) - 4 - benzyloxy - indole - methanesulfonate which, upon recrystallization from ethanol, is in the form of needles which melt at 271–273°.

*Example 25*

A solution of 1.9 parts of 3-(2'-aminopropyl)-4-benzyloxy-indole in 25 parts by volume of methanol is shaken with 1 part of palladium catalyst on aluminum oxide carrier and with hydrogen until uptake of the latter is complete. The solution is thereupon filtered, the filtrate evaporated to dryness and the resultant residue crystallized from a mixture of chloroform with methanol and petroleum ether, the so-obtained 3-(2'-aminopropyl)-4- hydroxy-indole being thus obtained in the form of uncharacteristic crystals which melt at 125–126°. Keller's color reaction: green, becomes gray. Van Urk's color reaction: dull blue.

With maleic acid, the base forms the 3-(2'-aminopropyl)-4-hydroxy-indole-bimaleinate which, upon recrystallization from acetone, is in the form of prisms which melt at 174–175°.

*Example 26*

2.2 parts of sodium are dissolved in 500 parts by volume of liquid ammonia, sodamide formed by oxidation by the addition of a trace of ferric nitrate, and 10 parts of 4-benzyloxy-indole then added. After 15 minutes, the dark-brown solution is combined with a mixture of 18 parts of methyl iodide and 10 parts of absolute ether; at the end of another 15 minute period, the ammonia is evaporated off. The dry residue is distributed between water and ether, the ether solution extensively concentrated under reduced pressure, and petroleum ether carefully added to the concentrated solution, whereupon 1-methyl-4-benzyloxy-indole crystallizes out in the form of octahedrons which melt at 78–79°.

18 parts by volume of dimethylformamide and 5 parts by volume of phosphorus oxychloride are admixed at 10–20°, with exclusion of moisture. Thereupon, in the course of 30 minutes and at 20–30°, a solution of 11.6 parts of 1-methyl-4-benzyloxy-indole in 12.5 parts by volume of dimethylformamide is added, the mixture heated to 35–37° for 45 minutes, and 50 parts of ice and 50 parts by volume of ice water stirred into the reaction mixture. Then a solution of 9.5 parts of solid sodium hydroxide in 50 parts by volume of water is added in the course of 30 minutes at 20–30°, three-fourths of the solution being added slowly dropwise and the remaining fourth being added all at once. The mixture is diluted with 100 parts by volume of water, then heated to boiling for three minutes, after which it is cooled. The 1-methyl-4-benzyloxy-indole-3-aldehyde which precipitates is filtered off with suction, washed five times with 25 parts by volume of water, and dried at 80° under reduced pressure. The so-obtained 1-methyl-4-benzyloxy-indole-3-aldehyde, recrystallized from chloroform-petroleum ether, is obtained as needles which melt at 120°. Keller's color reaction and Van Urk's color reaction: negative.

13 parts of 1-methyl-4-benzyloxy-indole-3-aldehyde, 2.85 parts of ammonium acetate and 70 parts by volume of nitroethane are stirred together for 40 minutes at 102°, the reaction mixture is then cooled and 200 parts by volume of water are added. The 1-methyl-3-(2'-methyl-2'-nitrovinyl)-4-benzyloxy-indole which crystallizes out is filtered off with suction and washed six times with 100 parts by volume of water. Recrystallized from chloroform-ethanol, the 1-methyl-3-(2'-methyl-2'-nitrovinyl)-4-benzyloxy-indole is obtained in the form of needles which melt at 142°. Keller's color reaction: first dark red, then immediately brown. Van Urk's color reaction: yellowish.

A solution of 13.85 parts of 1-methyl-3-(2'-methyl-2'-nitrovinyl)-4-benzyloxy-indole in 130 parts by volume of tetrahydrofurane is added dropwise in the course of 15 minutes to a solution, heated to 50°, of 21 parts of lithium aluminum hydride in 250 parts by volume of tetrahydrofurane, and the mixture then stirred for 10 hours at 50°. The obtained complex and also excess lithium aluminum hydride are then decomposed with methanol and saturated aqueous sodium sulfate solution, the mixture filtered and the filtrate washed with chloroform and then evaporated to dryness. The resultant residue is distributed between ether and aqueous tartaric acid solution, the acid solution then adjusted to alkalinity with dilute aqueous sodium hydroxide while cooling with ice, then quickly shaken out several times with ether, the combined ether extracts dried over sodium sulfate, and the ether evaporated off. The so-obtained 1-methyl-3-(2'-aminopropyl)-4-benzyloxy-indole is, following crystallization from ethylacetate, obtained in the form of needles which melt at 109–110°. Keller's color reaction: olive-green. Van Urk's color reaction: negative.

*Example 27*

A solution of 3.987 parts of 1-methyl-3-(2'-aminopropyl)-4-benzyloxy-indole in 50 parts by volume of methanol is shaken with hydrogen and 2.5 parts of palladium catalyst on aluminum oxide carrier until uptake of hydrogen ceases, whereupon the catalyst is filtered off and the filtrate evaporated to dryness. The resultant residue—1-methyl-3-(2'-aminopropyl)-4-hydroxy-indole—crystallizes from ethylacetate in the form of druse-shaped crystals which melt at 133–134°. Keller's color reaction: dark olive-green. Van Urk's color reaction: green.

Having thus disclosed the invention, what is claimed is:

1. The method of inducing psychic stimulation and concomitantly alleviating mental depression of neurotic and psychotic origin in a mental depressive, which comprises administering to the mental depressive a psychotropically effective dose of a central nervous system stimulant compound of the formula

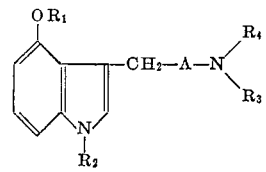

wherein $R_1$ is a member selected from the group consisting of H, lower alkyl and lower aralkyl, $R_2$ is member selected from the group consisting of H, lower alkyl and lower aralkyl, each of $R_3$ and $R_4$ is selected from the group consisting of H and lower alkyl and $R_3$ and $R_4$ taken together with the adjacent nitrogen atom represent a piperidino group, and A is alkylene with at most 3 carbon atoms.

2. The method of inducing psychic stimulation and concomitantly alleviating mental depression of neurotic and psychotic origin in a mental depressive, which comprises administering to the mental depressive a psychotropically effective dose of a therapeutically useful salt of a central nervous system stimulant compound of the formula

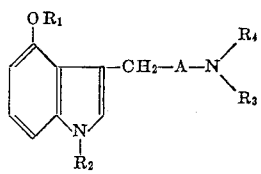

wherein $R_1$ is a member selected from the group consisting of H, lower alkyl and lower aralkyl, $R_2$ is a member selected from the group consisting of H, lower alkyl and lower aralkyl, each of $R_3$ and $R_4$ is selected from the group consisting of H and lower alkyl and $R_3$ and $R_4$ taken together with the adjacent nitrogen atom represent a piperidino group, and A is alkylene with at most 3 carbon atoms.

3. The method of inducing psychic stimulation and concomitantly alleviating mental depression of neurotic and psychotic origin in a mental depressive which comprises administering to the mental depressive a psychotropically effective dose of a central nervous system stimulant compound of the formula

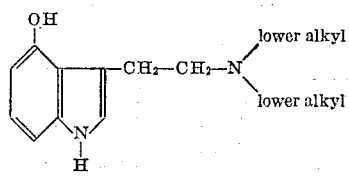

4. The method of inducing psychic stimulation and concomitantly alleviating mental depression of neurotic and psychotic origin in a mental depressive which comprises administering to the mental depressive a psychotropically effective dose of a therapeutically useful salt of a central nervous system stimulant compound of the formula

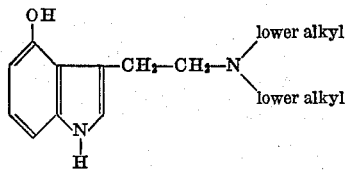

5. The method of inducing psychic stimulation and concomitantly alleviating mental depression of neurotic and psychotic origin in a mental depressive, which comprises administering to the mental depressive a psychotropically effective dose of 4-hydroxy-3-(2'-dimethylaminoethyl)-indole.

References Cited in the file of this patent

UNITED STATES PATENTS

| | | |
|---|---|---|
| 2,708,197 | Speeter | May 10, 1955 |
| 2,854,379 | Fancher | Sept. 30, 1958 |
| 2,902,404 | Spencer | Sept. 1, 1959 |
| 2,930,797 | Anthony et al. | Mar. 29, 1960 |

FOREIGN PATENTS

| | | |
|---|---|---|
| 781,390 | Great Britain | Aug. 21, 1957 |